United States Patent
Yang et al.

(10) Patent No.: US 7,052,296 B2
(45) Date of Patent: May 30, 2006

(54) DOCKING STATION FOR A PORTABLE COMPUTER

(75) Inventors: Myeong Kyoo Yang, Suweon-si (KR); Joung Sea Park, Seoul (KR); Dong Joon Choi, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/375,118

(22) Filed: Feb. 28, 2003

(65) Prior Publication Data

US 2004/0043650 A1    Mar. 4, 2004

(30) Foreign Application Priority Data

Aug. 29, 2002    (KR) ............... 10-2002-0051611

(51) Int. Cl.
*H01R 3/00*    (2006.01)

(52) U.S. Cl. .................................... 439/165

(58) Field of Classification Search ............... 439/150, 439/159, 165, 341, 142; 361/686, 683, 681, 361/680; 248/923, 179, 183, 371, 125.1, 248/278, 921, 917, 278.1; 345/156, 1.1
See application file for complete search history.

(56) References Cited

U.S. PATENT DOCUMENTS

| | | | |
|---|---|---|---|
| 4,542,377 A | 9/1985 | Hagen et al. ............... 340/727 |
| 5,316,491 A | 5/1994 | Satou et al. ............... 439/159 |
| 5,335,142 A | 8/1994 | Anderson ................... 361/681 |
| 5,436,792 A | 7/1995 | Leman et al. .............. 361/686 |
| 5,751,548 A * | 5/1998 | Hall et al. ................. 361/686 |
| 5,900,848 A * | 5/1999 | Haneda et al. ................. 345/1 |
| 5,923,528 A * | 7/1999 | Lee .............................. 361/681 |
| 6,108,200 A | 8/2000 | Fullerton ..................... 361/686 |
| 6,185,096 B1 * | 2/2001 | Helot et al. ................. 361/686 |
| 6,275,376 B1 | 8/2001 | Moon ........................ 361/683 |
| 6,788,527 B1 | 9/2004 | Doczy et al. ............... 361/680 |
| 2003/0221876 A1 | 12/2003 | Doczy et al. ............ 178/18.01 |
| 2003/0222149 A1 | 12/2003 | Solomon et al. ........ 235/472.01 |
| 2003/0222848 A1 | 12/2003 | Solomon et al. ............ 345/156 |
| 2003/0223185 A1* | 12/2003 | Doczy et al. ............... 361/680 |
| 2003/0235029 A1 | 12/2003 | Doherty et al. ............ 361/683 |

FOREIGN PATENT DOCUMENTS

EP    626632 A1    11/1994

\* cited by examiner

*Primary Examiner*—Alexander Gilman
(74) *Attorney, Agent, or Firm*—Fleshner & Kim, LLP

(57) ABSTRACT

Embodiments of the present invention relate to an apparatus including a dock and a stand. The dock is configured to receive a portable computer. A stand is pivotably attached to the dock. Some embodiments may have the advantage that a portable computer can be used during travel and used as a desktop computer having a larger keyboard and a wide range of peripheral devices. In some embodiments, the display of the portable computer is used when the portable computer is docked in the dock. Further, because the portable computer can be pivotably attached within the dock, for example by a cradle and arm, the display can be selectively used in a landscape mode or a portrait mode. Particularly, the dock (with the portable computer attached) may be rotatable to change the angle at which a user can view the display. Additionally, because the dock is pivotably attached to the stand there is unique versatility of viewable options of the display of the portable computer, when it is used as a desktop computer.

6 Claims, 19 Drawing Sheets

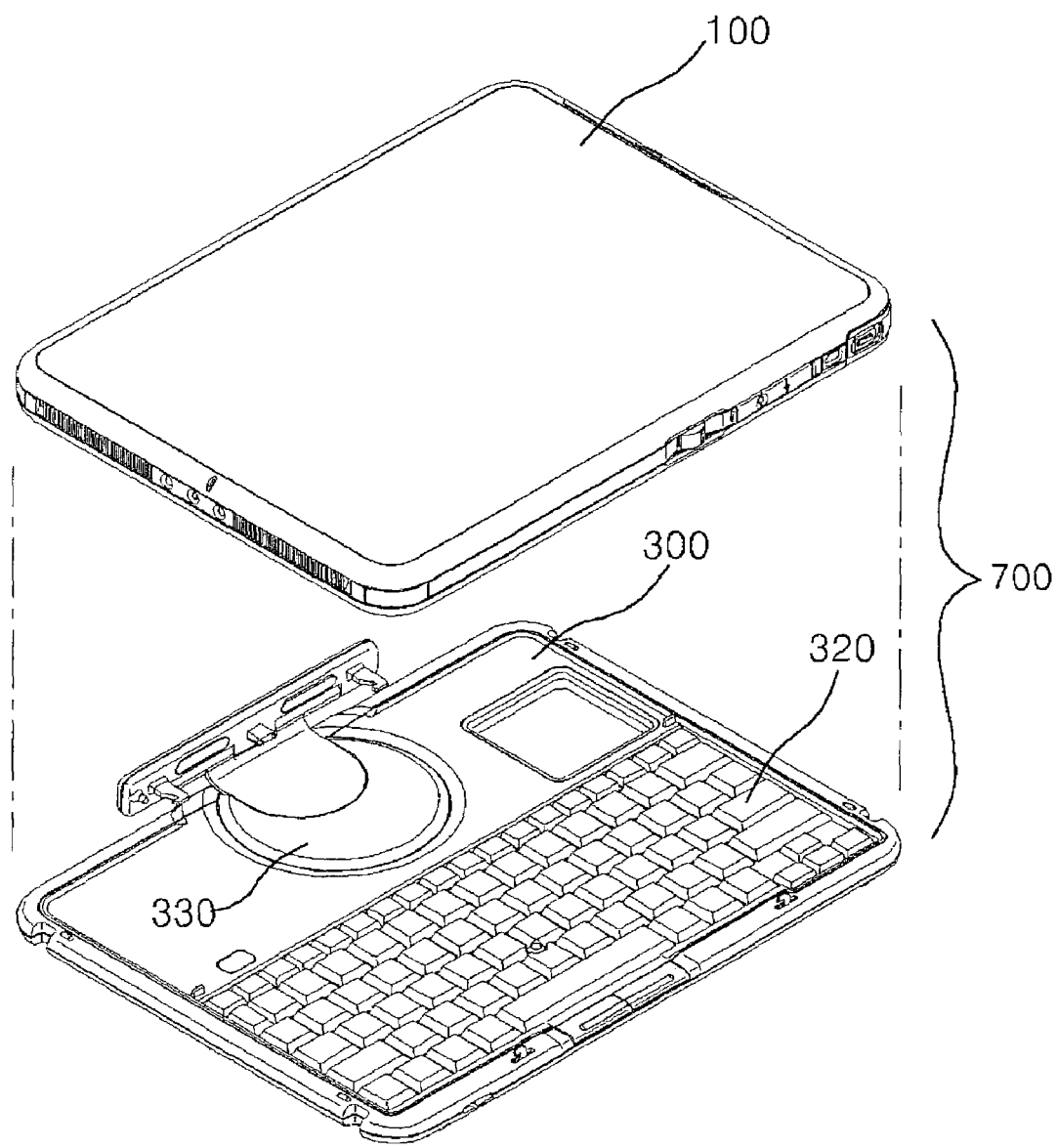

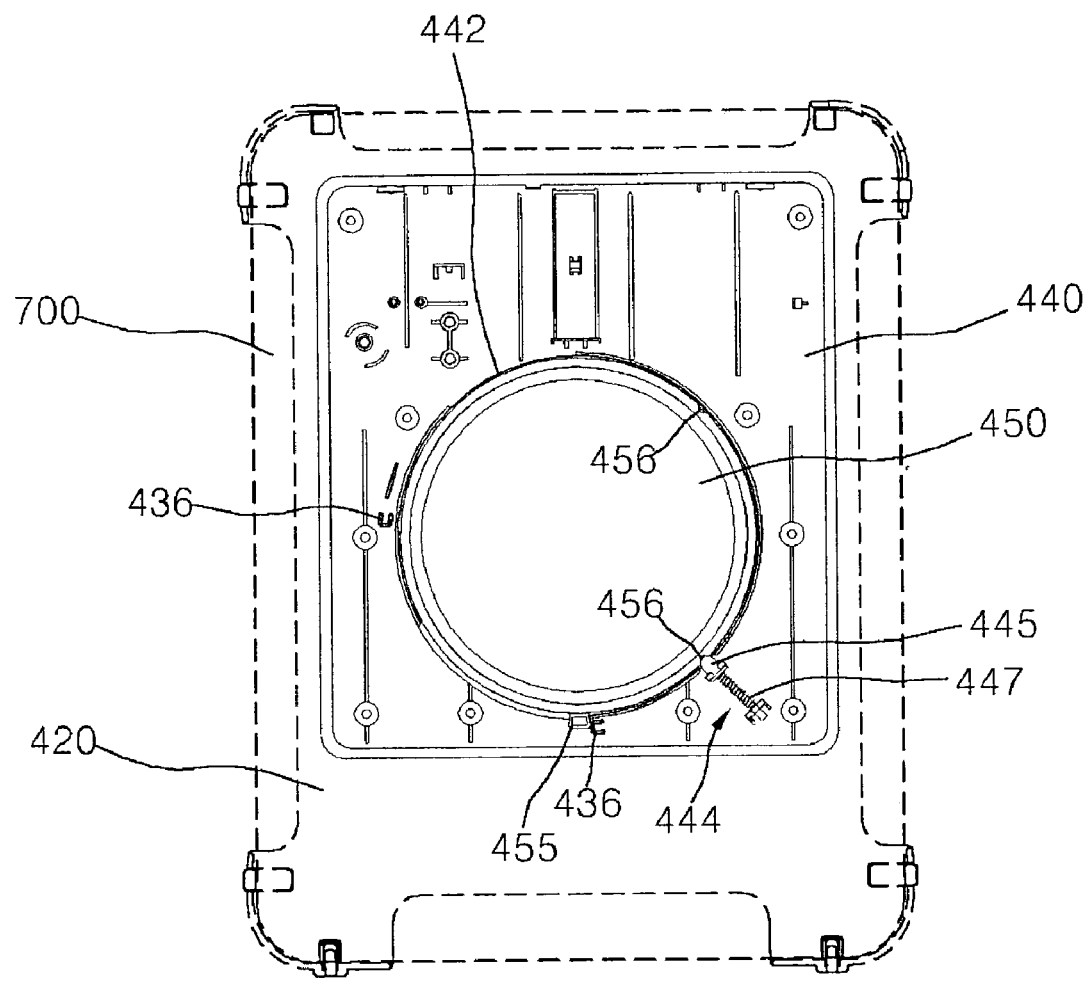

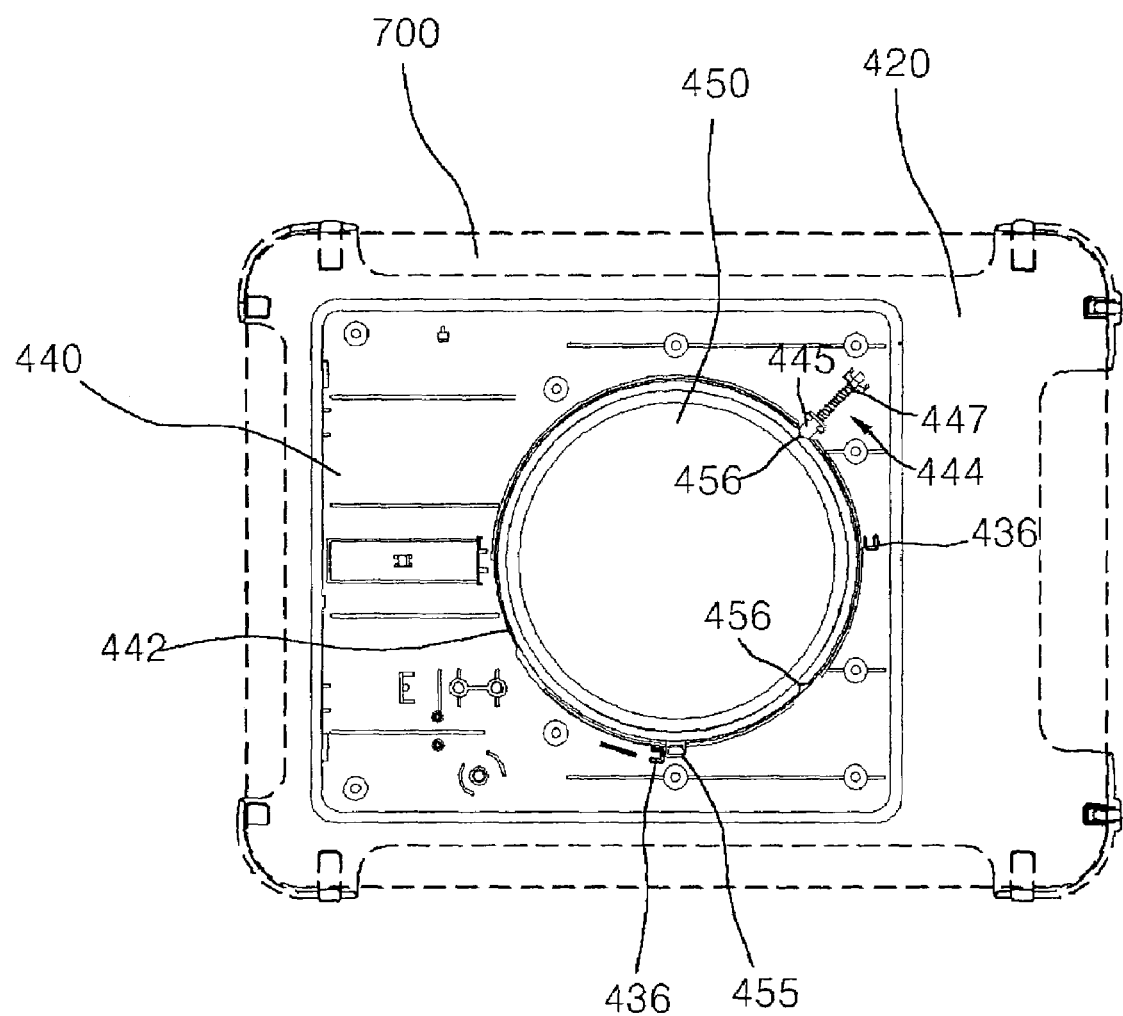

FIG. 10A
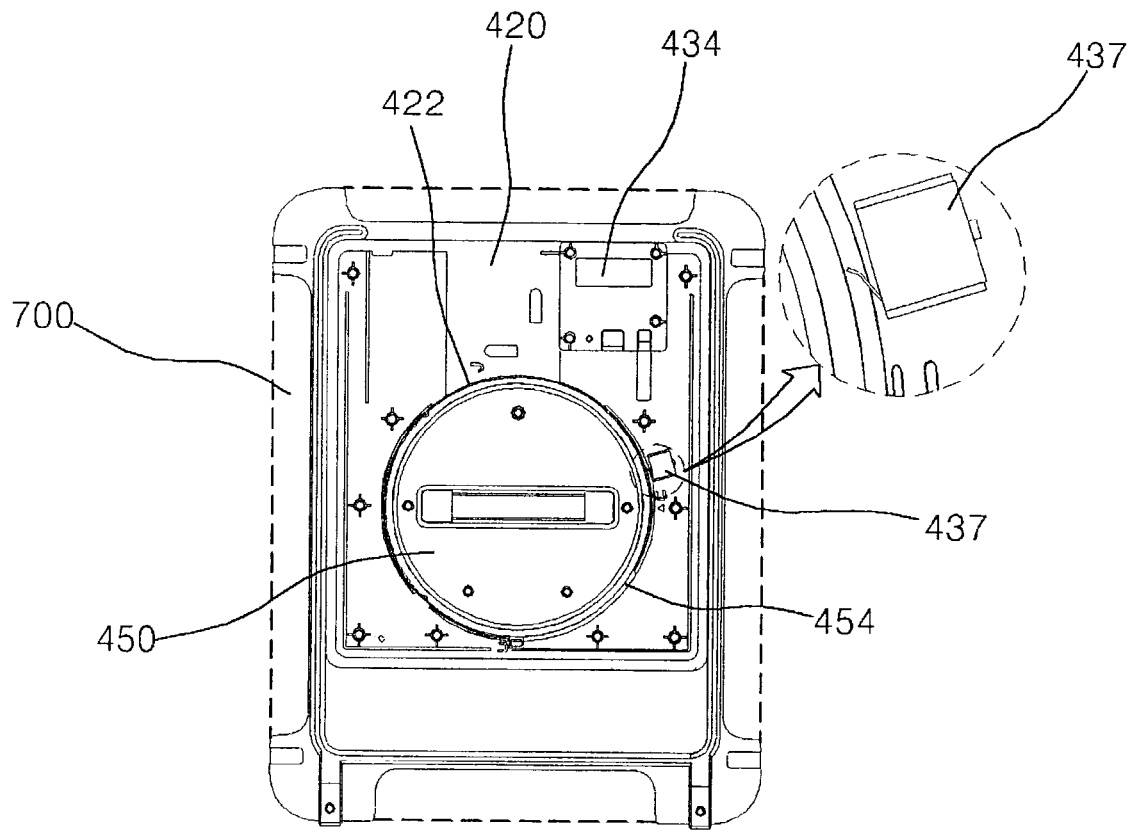
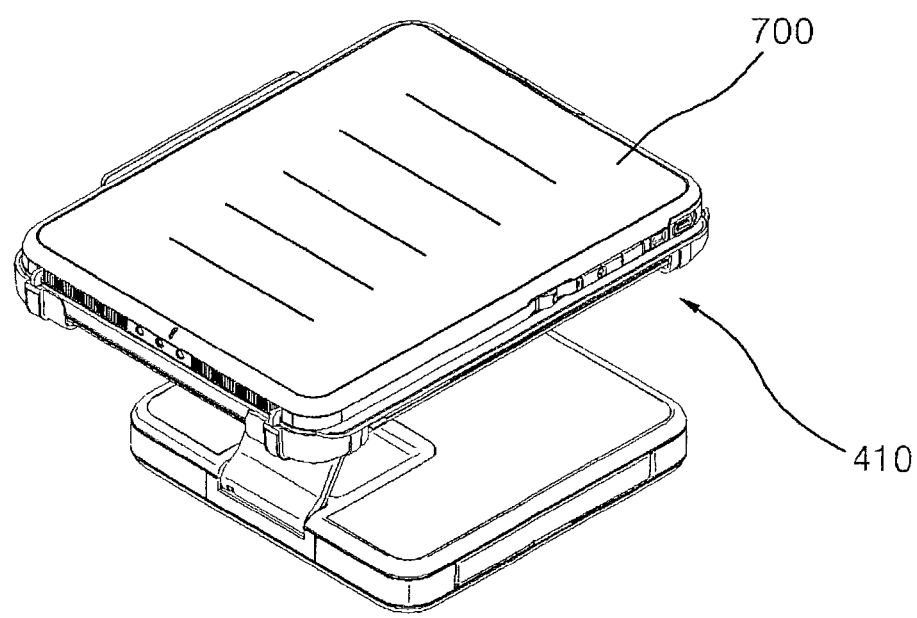

DOCKING STATION FOR A PORTABLE COMPUTER

BACKGROUND OF THE INVENTION

1. Field of the Invention

The present invention relates at least to accessories of a portable computer.

2. Background of the Related Art

Mobile computers (e.g. laptops) are useful to many computer users, allowing them to travel and use a computer. Desktop computers are also useful, because they generally have large keyboards and a wide variety of peripheral devices. Large keyboards or a wide variety of peripheral devices may not be practical in a mobile computer, because they may make the mobile computer prohibitively large or heavy (e.g. making them ill suited for traveling). Accordingly, there has been a long felt need for a computer that is mobile, but also has a capabilities of a larger keyboard and a broad range of peripheral device.

SUMMARY OF THE INVENTION

Advantages of embodiments of the present invention at least include solving disadvantages of the related art. Embodiments of the present invention relate to an apparatus including a dock and a stand. The dock is configured to receive a portable computer. A stand is pivotably attached to the dock. Some embodiments may have the advantage that a portable computer can be used during travel and used as a desktop computer having a larger keyboard and a wide range of peripheral devices. In some embodiments, the display of the portable computer is used when the portable computer is docked in the dock. Further, because the portable computer is pivotably attached to the dock the display can be selectively used in a landscape mode or a portrait mode. Particularly, the dock (with the portable computer attached) may be rotatable to change the angle at which a user can view the display. Additionally, because the dock is pivotably attached to the stand, there is unique versatility of viewable options of the display of the portable computer, when it is used as a desktop computer For example, if a user desires to view an output of a display in a manner that the display is longer in the vertical direction than in the horizontal direction, then the dock is rotated to cause the portable computer to display in portrait mode. Alternatively, if a user desires to view an output of a display in a manner that the display is longer in the horizontal direction than in the vertical direction, then the dock is rotated 90 degrees from the portrait mode to the landscape mode.

To achieve at least these and other advantages in whole or in part and in accordance with the purpose of the present invention, as embodied and broadly described herein, there is provided an apparatus that includes a dock configured to receive a portable computer, and a stand pivotably attached to the dock.

To further achieve at least these and other advantages in whole or in part and in accordance with the purpose of the present invention, as embodied and broadly described herein, there is provided a screen adjustment structure of a computer system for converting screen mode of the computer system from portrait mode to landscape mode or from the landscape mode to the portrait mode by rotating a cradle on which the computer system is cradled through a rotation guide member at a designated angle, the screen adjustment structure including an orientation switch that is on an outer surface of a through hole on a rear surface of the cradle configured to adjust the screen mode of the computer system to the portrait mode or the landscape mode by switching through rotation of the cradle, and a circumference projection that is on a circumferential surface of the rotation guide member configured to switch the orientation switch to make the screen mode of the computer system adjust to the portrait mode or the landscape mode when the cradle rotates past a predetermined angle.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIGS. 2A, 2B, and 2C are diagrams illustrating an exemplary web pad system.

FIG. 9a is an exemplary diagram illustrating a state before a cradle unit is rotated.

FIG. 9c is an exemplary diagram illustrating a state where the cradle unit is rotated at a designated angle.

FIG. 10a diagrammatically illustrates an exemplary screen mode at the portrait mode before it is converted to the landscape mode.

DETAILED DESCRIPTION OF PREFERRED EMBODIMENTS

Figure 1:
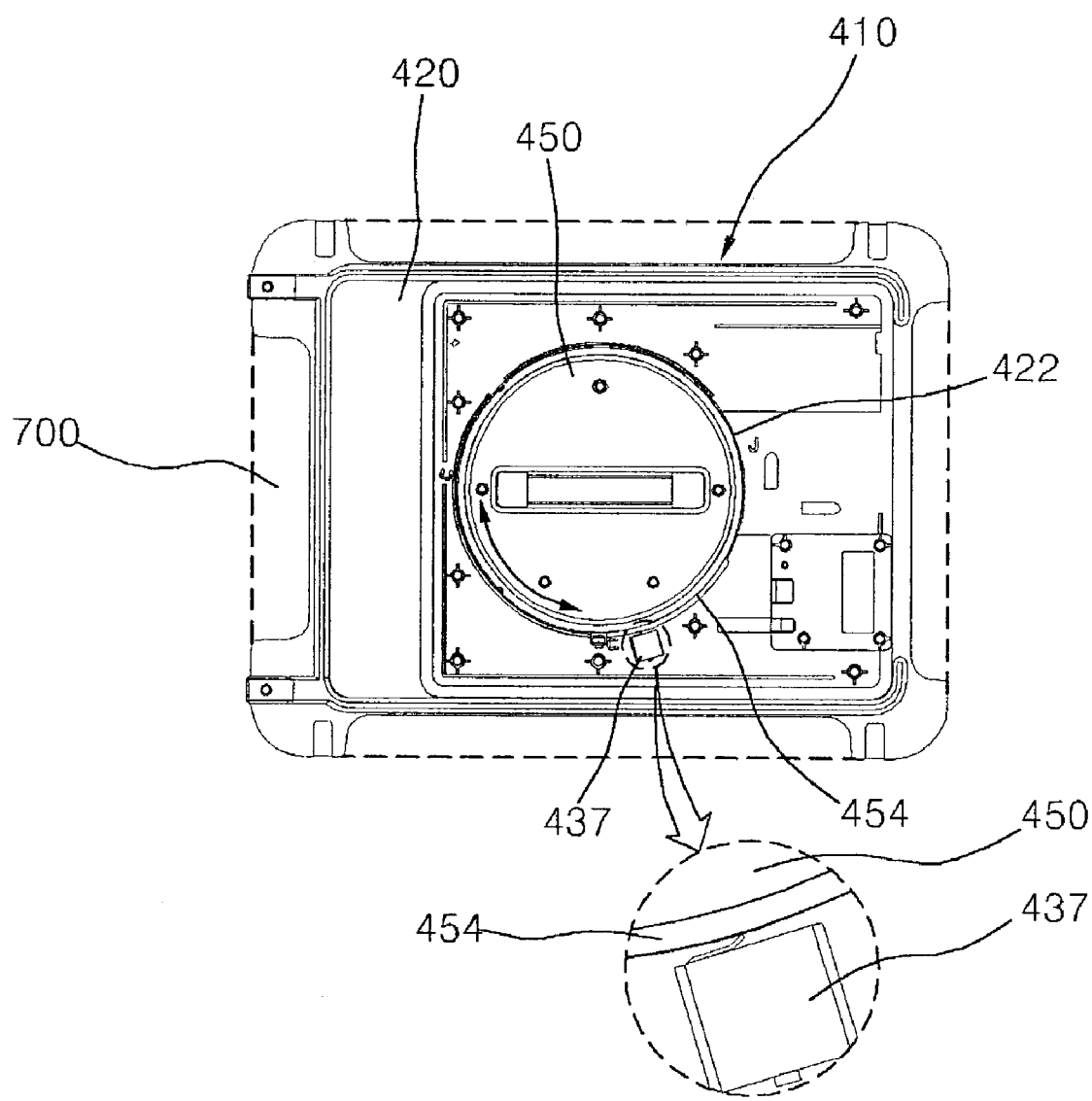
FIG. 1 is an exemplary diagram illustrating coupling of a web pad cradle and a rotation guide member.

FIG. 1 diagrammatically depicts a situation in which a web pad cradle and a rotation guide member, to which a web pad system with convertible screen is applied, can be coupled to each other. The web pad system with a convertible screen mode according to embodiments of the present invention can help users to more conveniently use the computer system at any place they want, by converting the screen mode from portrait to landscape or from landscape to portrait by rotating a cradle unit 410 on which the web pad system 700 is cradled through a rotation guide member 450 at a designated angle. An orientation switch 437, which can be fixated on peripheral surface of a through hole on the rear surface of the web pad cradle and switched by rotation of the web pad cradle, can convert the screen mode of the web pad system 700 from portrait to landscape or from landscape to portrait by being switched by a circumference projection 454 of the rotation guide member 450.

Figure 2B:
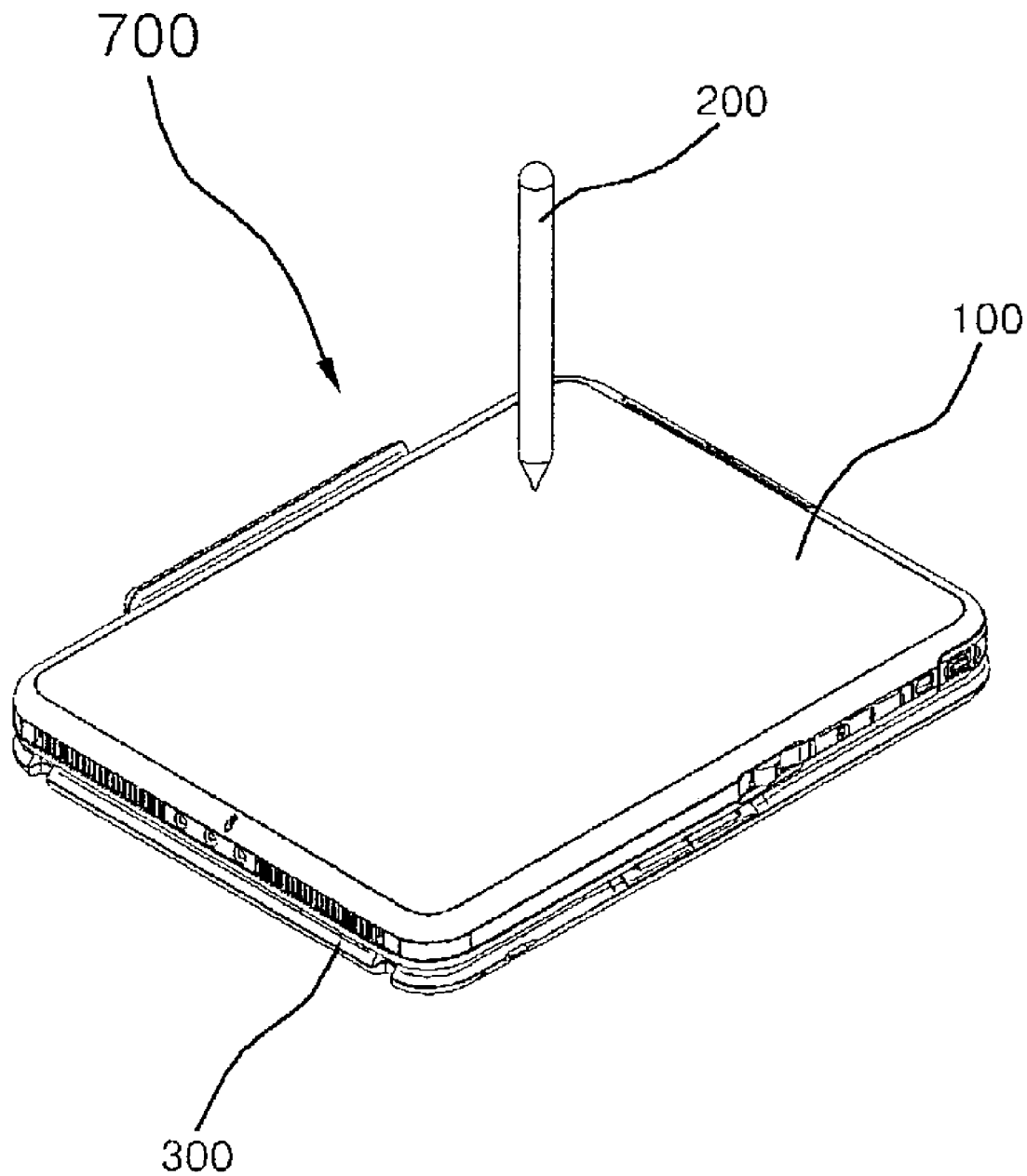
Figure 2C:
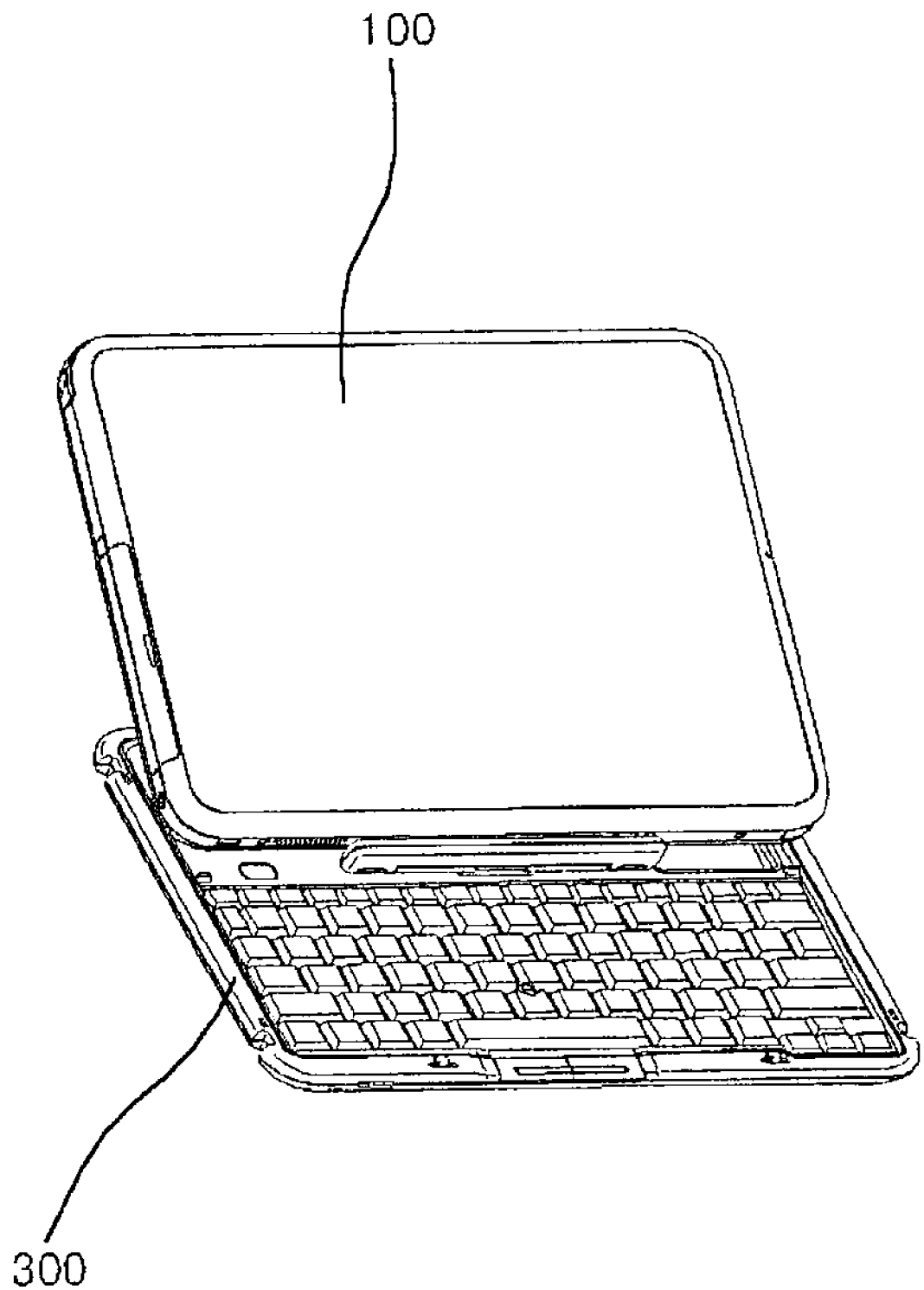

FIGS. 2A, 2B, and 2C diagrammatically depict a decomposed exemplary web pad system of a multi-type computer system being cradled in a docking station to which embodiments of the present invention can be applied. As shown in FIGS. 2A, 2B, and 2C, the web pad system 700 can include a web pad 100 having a plurality of panels and a main system, and a keyboard 300 having a key pad 320 and a rotation member 330 being coupled to central portion of a rear end. The web pad 100 can be superposed to the keyboard 300 using the rotation member 330 to rotate around at a variable designated angle.

If the keyboard 300 is superposed with the web pad system 700 as described above, the user can input data in the web pad system 700 by using a stylus pen 200 as input device, for example as shown in FIG. 2A. By rotating the web pad 100 around the keyboard 300 being superposed on the web pad 100 at a designated angle, the user can input vast amount of data because the input device of the web pad 100 is preferably not the stylus pen 200 at this time, but the keyboard 300 itself, for example as shown in FIG. 2C. In this case, the user can place the web pad system 700 on a desk or table, as he/she does with the conventional notebook PC, and input data more conveniently. In addition, since the web pad 100 and the keyboard 300 can be superposed with each other, the user can carry the web pad system 700 more conveniently and input data by selectively using the stylus pen 200 or the keyboard 300.

Figure 3:
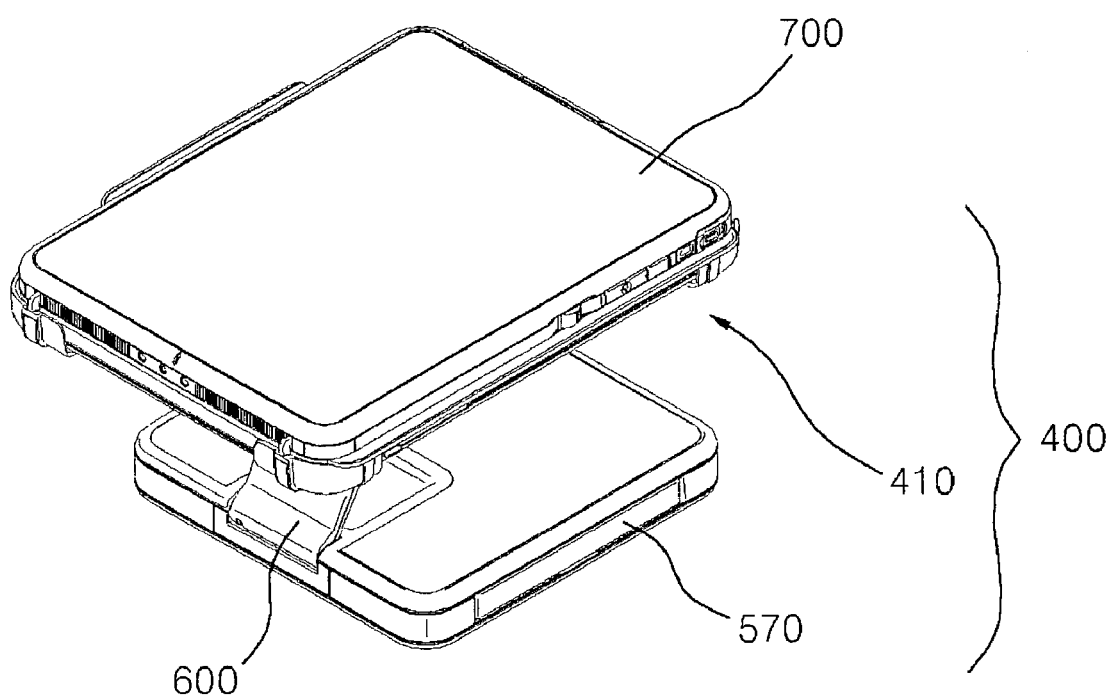
FIG. 3 is a perspective view illustrating an exemplary docking station where a web pad system is cradled on a cradle.
Figure 4A:
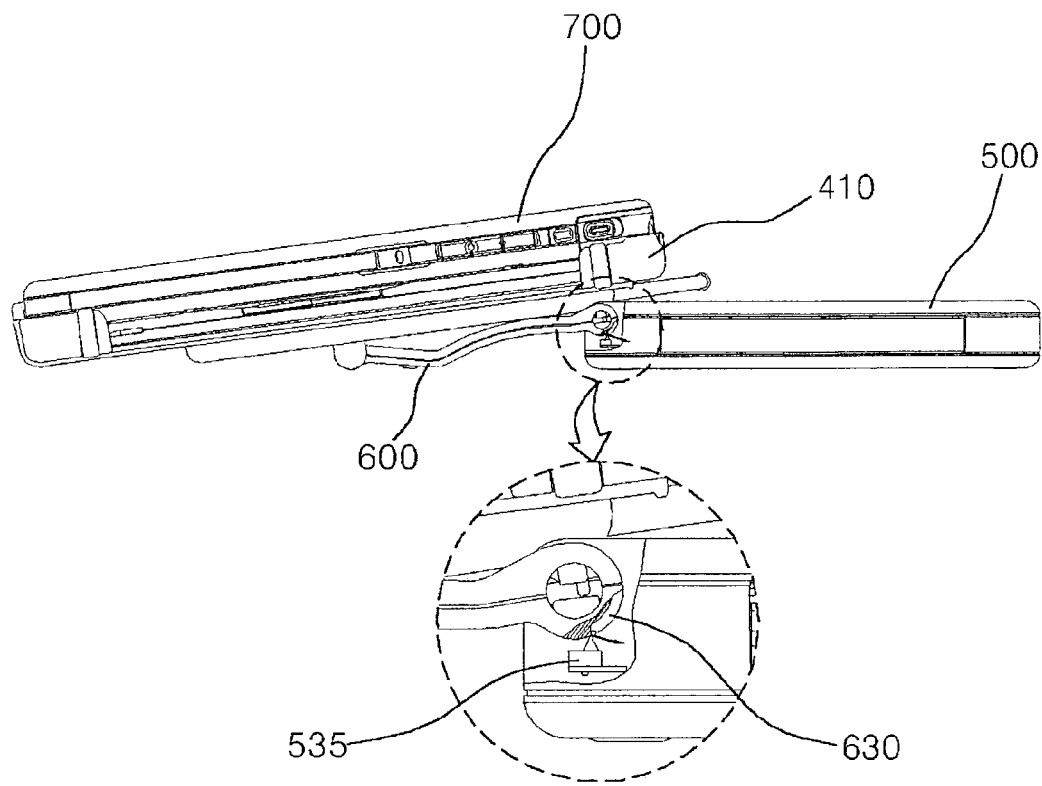
FIGS. 4A and 4B are diagrams illustrating an exemplary arm unit in operation, wherein a specific program may be for recognizing a writing function of a stylus pen which may be operated on a screen as a switch contact groove and/or a sliding switch may be switched with each other through rotation of the arm unit.
Figure 4B:
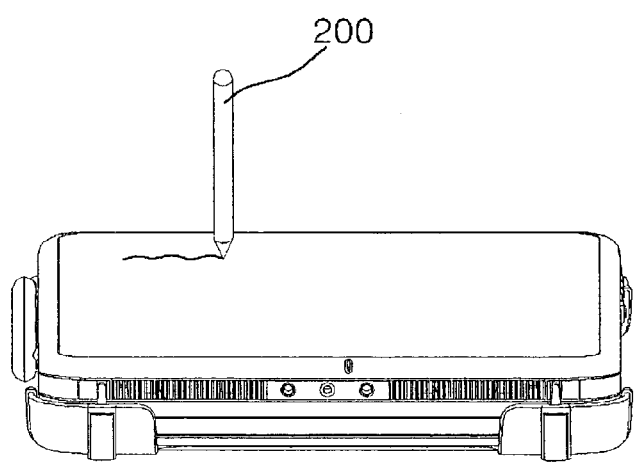

FIG. 3 is a perspective view representing an exemplary docking station where a web pad system is cradled on a cradle according to embodiments of the present invention. FIGS. 4A and 4B diagrammatically depict an arm unit in operation, wherein a specific program for recognizing a writing function of a stylus pen is being operated on a screen as a switch contact groove and a sliding switch are switched with each other through rotation of the arm unit.

As depicted in FIG. 3, the stand unit 500 preferably acts as base for supporting the web pad's weight that is cradled in a web pad cradle 420 of the cradle unit 410 with help of a plate being the center of weight, and at the same time, can insert extension equipment 570 like CD-ROM or FDD disk mounted in the stand unit 500 to extend the web pad system's functions. Also, the arm unit 600, as shown in FIG. 3 and FIGS. 4A and 4B, can support the cradle unit 410 to which the web pad system 700 is cradled by being coupled to the bottom surface of the cradle unit 410 and to the upper end of the stand unit 500, respectively, and simultaneously, convert the screen of the web pad system 700 to one with a specific program that enables the user to write text by using the stylus pen 200 when the cradle unit 410 gets adhered closely to the upper end of the stand unit through the arm unit's rotation and then a sliding switch 535 of the stand unit 500 is switched with help of a switch contact groove 630 at a lower end of the arm unit 600.

Cradle unit 410, another component of a docking station 400 to which the web pad system 700 is cradled while it being supported by the stand unit 500 through the connection with the arm unit 600, can enable the user to utilize the web pad system 700 as a desktop computer. The cradle unit 410 also can include a built-in web pad system separating apparatus 460 for separating the web pad system 700 from the cradle unit 410. Therefore, the user can easily separate the web pad system from the cradle unit 410 with help of a multi-step cam operation of the web pad system separating apparatus 460.

Figure 5:
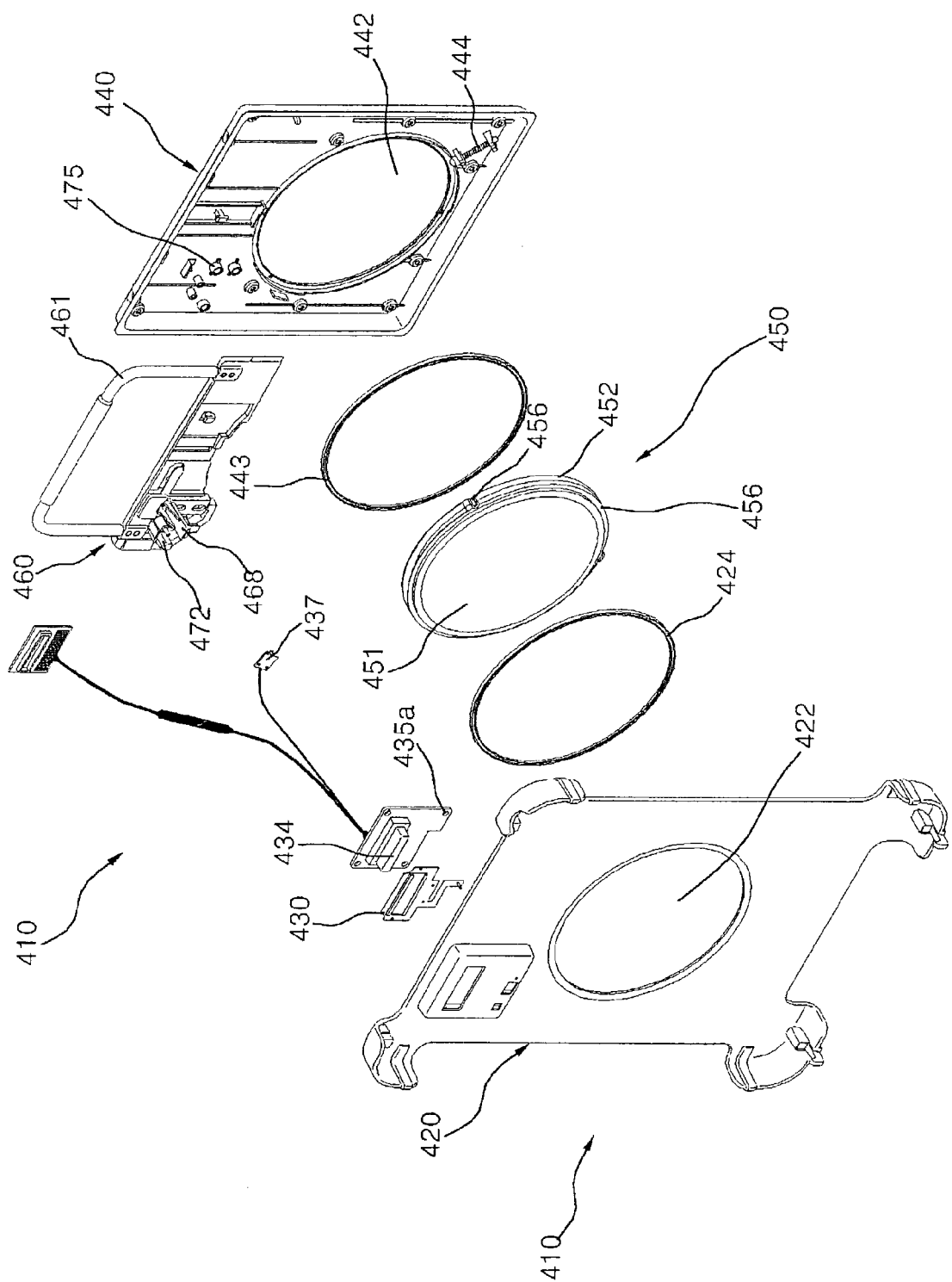
FIG. 5 is an exemplary sectional perspective view of an exemplary cradle unit.
Figure 6:
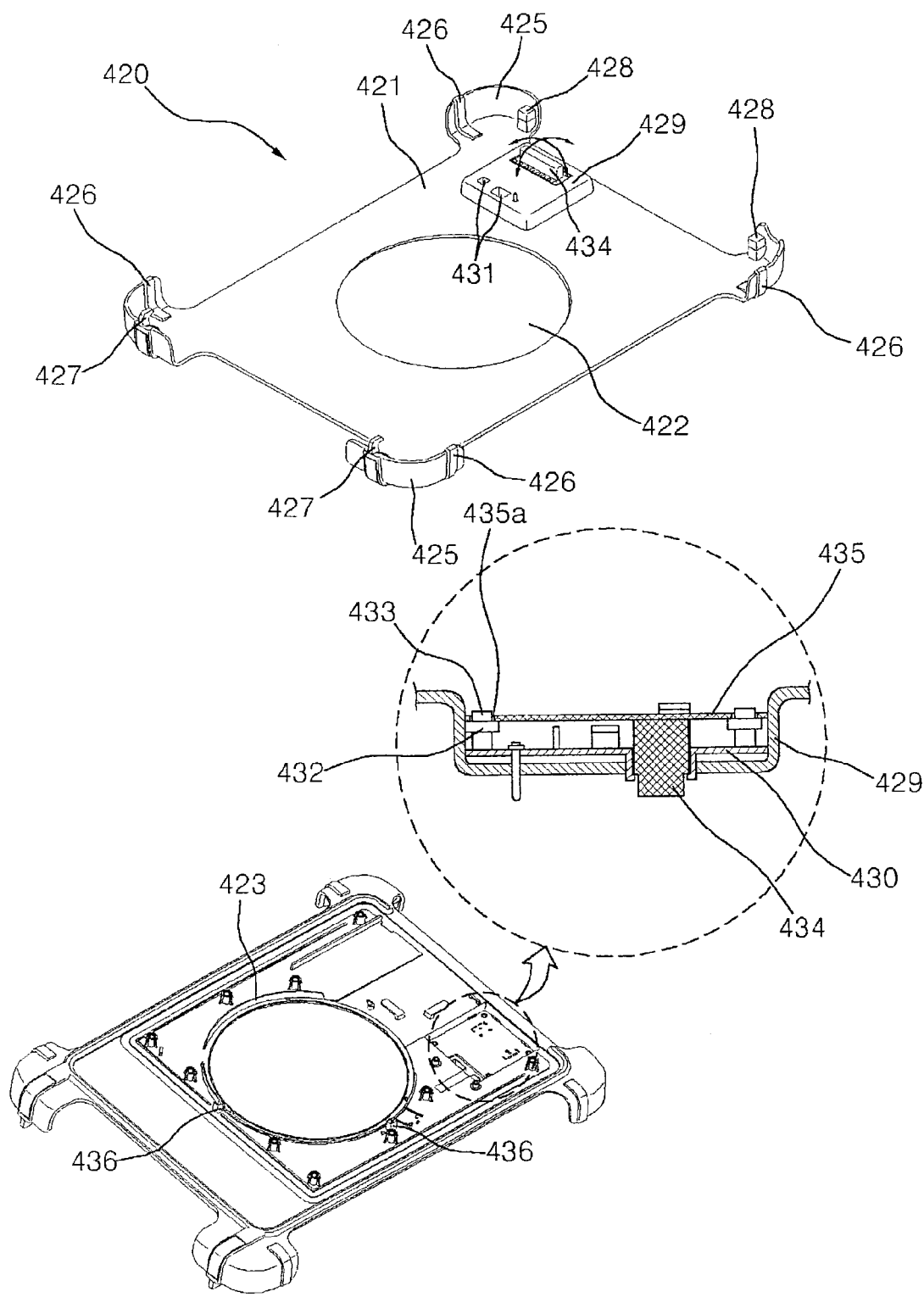
FIG. 6 are plane and bottom perspective views of exemplary components of a web pad cradle.
Figure 7:
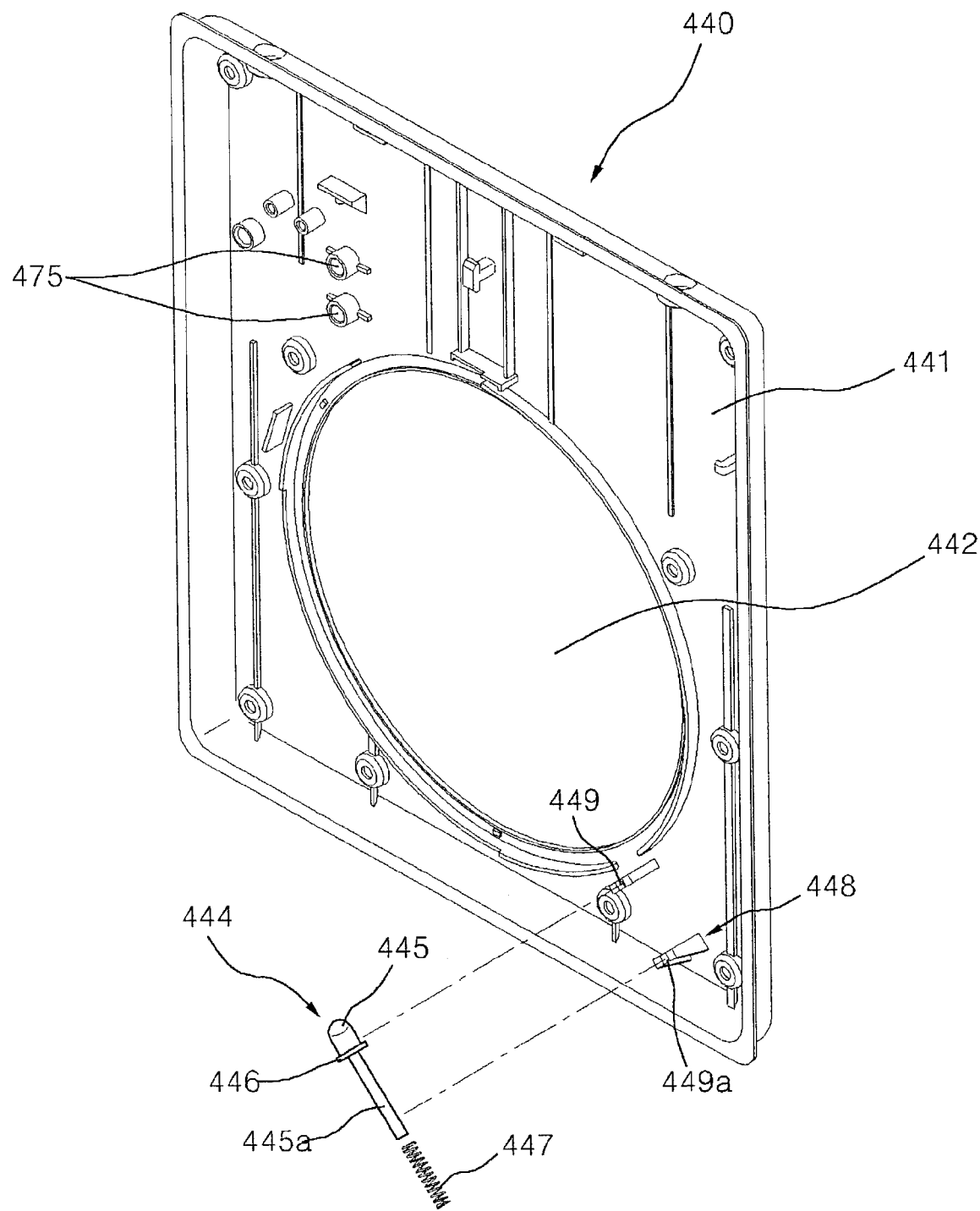
FIG. 7 is a plane perspective view of components of an exemplary cradle rear cover.
Figure 8:
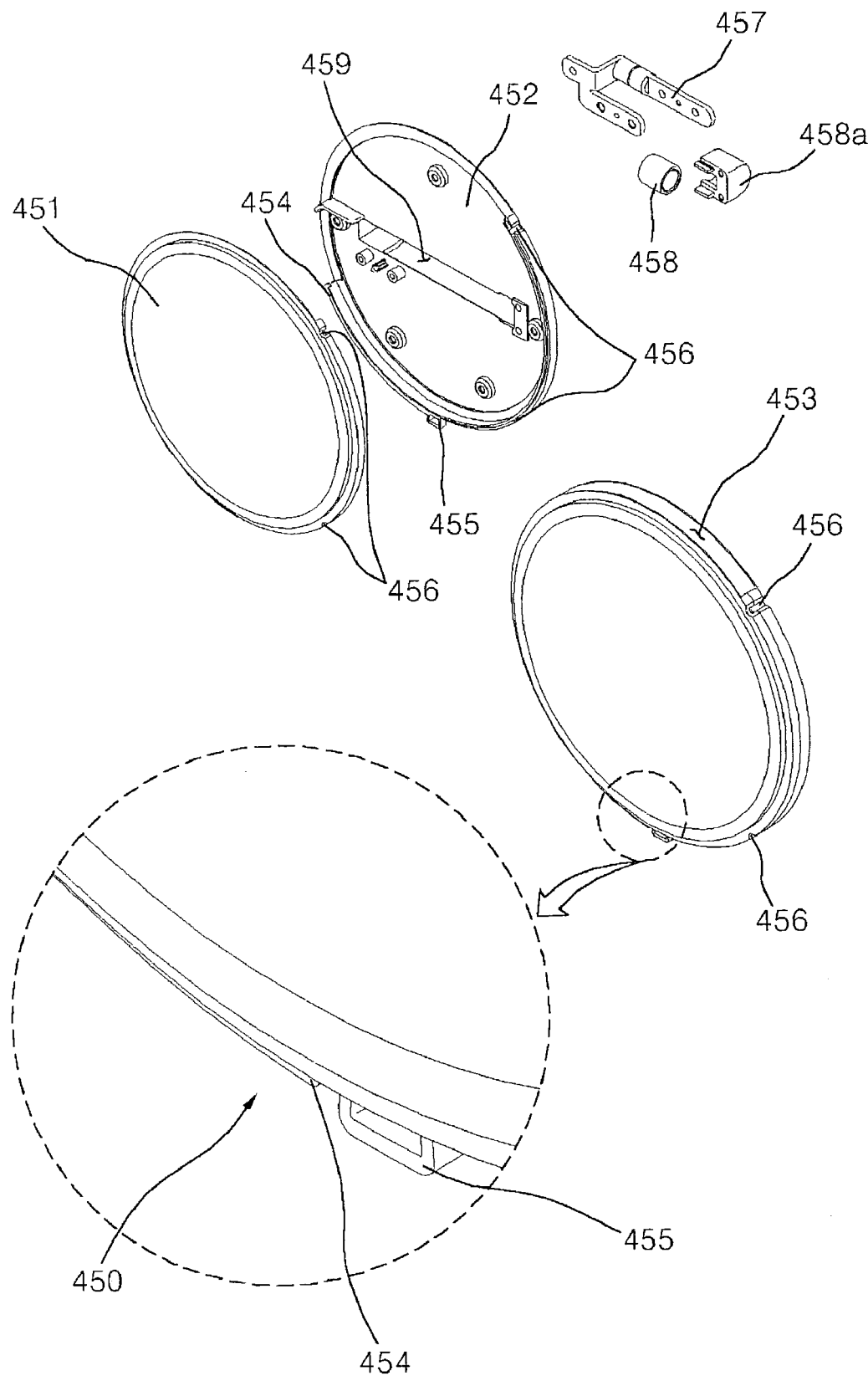
FIG. 8 is a sectional perspective view of exemplary components of a rotation guide member.

FIG. 5 is a sectional perspective view of a cradle unit according to embodiments of the present invention. FIG. 6 is a plane and bottom perspective view of a web pad cradle out of components of the cradle unit. FIG. 7 is a plane perspective view of a cradle rear cover out of components of the cradle unit. FIG. 8 is a sectional perspective view of a rotation guide member out of components of the cradle unit.

The cradle unit 410, as depicted in FIGS. 5 and 6, can include a web pad cradle 420 to which the web pad system 700 is cradled, a rear cover 440 being secured at the rear surface of the web pad cradle 420, a rotation guide member 450 and the web pad system separating apparatus 460. The rotation guide member 450 can be inserted and secured at each through hole 422, 442 formed on designated positions of the web pad cradle 420 and the cradle rear cover 440, respectively, and preferably rotating the web pad system 700 placed on the web pad cradle 420 at a designated angle (e.g., circumferential direction) depending on different usage of the user. The web pad system separating apparatus 460 can be fixated at the inner side of the cradle rear cover 440 for separating the web pad system 700 from the web pad cradle 420 preferably with help of multi-step cam motion that is made by external force applied on a separating handle 461.

The web pad cradle 420, as FIGS. 5 and 6 illustrate, can include a square-shaped cradling plate 421 on which the web pad system 700 is adhered with the through hole 422 at the center for the guide upper plate 451 of the rotation guide member 450 to be inserted, and a plurality of cradling holders 425 with a certain height at the corners of the plate 421 for enabling the web pad system 700 to be cradled onto the cradling plate 421. A fixing projection unit 429 can be inserted into the bottom surface of the web pad system 700 to reduce or prevent the web pad system 700 from moving up and down or right and left at the cradling plate 421. A drive connector 434 can be inserted in the inner side of the fixing projection 429 and also coupled to the drive socket 140 on the bottom surface of the web pad system 700 for interfacing the disk drive (e.g. extension equipment) and the web pad system 700. A plurality of angle limiting projections 436 can be formed at intervals (e.g., regular) at the circumference of the through hole 422 on the rear surface of the cradling plate 421 for limiting the web pad system 700 being cradled onto the web pad cradle 420 to rotate by more than a designated angle with help of the rotation guide member 450. In addition, an orientation switch 437 can be fixed at the circumferential surface of the through hole 422 on the rear surface of the cradling plate 421 for switching the screen mode of the web pad system 700 to portrait or landscape mode as the cradling plate 421 rotates.

Further, a ring-type guide rail 424 can be established on the through hole 422 formed on the cradling plate 421 for facilitating rotation of the web pad cradle 420 by the rotation guide member 450. A curved surface projection unit 423 with part of it being cut open can be formed on the front ending portion of the circumferential surface of the through hole 422 on the rear surface of the cradling plate 421 for allowing connecter PCB wires 435 disposed inside of the rotation guide member 450 to move freely and at the same time, for preventing the ring-shaped guide rail 424 attached to the through hole 422 from being separated when the cradling plate 421 rotates at a designated angle with help of the rotation guide member 450.

A rubber band 426 or the like can be attached inside/outside of one side of the cradle holder unit 425, respectively, for preventing the web pad system from being easily separated because of frictional force and elasticity of rubber as the web pad system 700 is cradled, and at the same time, for supporting the cradle unit 410 not to be slid onto the bottom surface as the cradle unit 410 is pulled down to be adhered closely to the bottom surface. Moreover, a hook-shaped fixing projection 427 or the like can be safely inserted inside of the lower end cradle holder unit 425 for more securely fixing the web pad system 700 on the web pad cradle 420.

In addition, a web pad settling projection 428 can be located inside of the cradle holder unit 425 for guiding and supporting the keyboard 300 of the web pad system 700, and simultaneously, for helping the web pad coupled to the keyboard 300 to be more securely and safely settled. The web pad settling projection 428 may maintain the same height as the fixing projection 429 in order to make the web pad without the keyboard 300 and the web pad system 700 to which the keyboard is connected preferably have equal height when each is attached.

A grounding member 430 for grounding the web pad system 700 can be inserted inside the fixing projection unit 429 in order to reduce or prevent any damage on the part caused by overcurrent or the like. Also, there are preferably through holes 431 at designated positions of the fixing projection unit 429 from which a locking member 468 and a separating member 472 of the separation apparatus 460 can be projected. The separation apparatus is for locking the web pad system 700 in an integrated position to web pad cradle 420 and simultaneously, for separating the web pad system 700 from the web pad cradle 420 with help of cam operation of the web pad system's separating apparatus 460.

In case of the fixing projection unit 429, there can be a connector settling projection 432 preferably with the same height as the drive connector 434 ending portion for helping the connector PCB 435 to safely settle in a designated position as the drive connector 434 ending portion attaches to the inner surface of the fixing projection unit 429 especially when the drive connector 434 is inserted. Internal thread 433 can be projected on the upper end of the connector settling projection 432, as the drive connector is inserted, is preferably slightly higher than the thickness of the connector PCB 435. If screw fastened or the like, the connector PCB 435 can form a plurality of through holes 435a at its circumferential side that have a slightly larger diameter than the projected internal thread unit 433. Therefore, when the drive connector 434 and the drive socket 140 are preferably locked to each other, the drive connector 434 can move up and down or right and left as much as the free space of the internal thread that is formed a little bit higher than the connector PCB 435, and connect with the drive socket or the like inside of the web pad system 700.

As shown in FIG. 5 and FIG. 7, the cradle rear cover 440 can include a cover member 441 fastened, for example by being screwed down, on the rear surface of the cradle plate 421. The cradle rear cover 440 can have a through hole 442 formed on an opposite position corresponding to the through hole 422 of the web pad cradle 420 for inserting a guide low plate 452 of the rotation guide member 450. A ring-shaped guide rail 443 can be attached to the through hole 442 on the cover member 441 in order to facilitate the rotation of the cradle rear cover 440 with help of the rotation guide member 450.

A hammering member 444 can be mounted at the upper end of one side of the through hole 442 for preferably generating a hammering sound through which a user can realize that the cradle unit 410 is properly rotated at a designated angle with help of the rotation guide member 450. The hammering member 444 can be fixed with help of a settling member 448 on one side of the circumferential front end of the through hole 442 to which the guide low plate 452 of the rotation guide member 450 is inserted. The hammering member 444 can have a front projection unit 445 inserted into a reentrant groove 449 at one side of the settling member 448 for enabling the hammering member 444 to hammer a hammering groove 456 on the circumferential surface of the rotation guide member 450. The hammering member 444 can be returned to its original position by indentation of the circumferential surface of the rotation guide member 450 or elastic returning force of spring 447 when the cradle rear cover 440 rotates at a designated angle or the like. A supporting rest 445a can be inserted into the reentrant groove 449 of the other settling member 448 for supporting the front projection unit 445 with help of the spring 447. A cradling jaw 446 can be formed on the circumferential surface of the front projection unit 445 for preventing the front projection unit 445 from being separated from the reentrant groove 449 on one side of the settling member 448 as it returns to the original position with help of elastic returning force of the spring 447.

Preferably, the hammering member 444 secured by the settling member 448 hits a hammering groove 456 formed on the circumferential surface of the rotation guide member 450 as it compresses/returns through the circumferential surface of the rotation guide member 450, and generates a hammering sound. Accordingly, the user can confirm that the cradle unit 410 is properly rotated at a designated angle.

As shown in FIG. 5 and FIG. 8, the rotation guide member 450 can include a rotation guide upper plate 451 to be inserted into the through hole 422 of the web pad cradle 420 for guiding rotation of the web pad cradle 420, a rotation guide low plate 452 to be inserted into the through hole 442 of the cradle rear cover 440 for guiding rotation of the cradle rear cover 440 and a cut-open groove 453 with a designated length that is formed on the two touching circumferential surfaces preferably for allowing the connector PCB 435 wires projected between the rotation guide upper plate 451 and the rotation guide low plate 452 to move more freely. Circumferential projection units 454 can be formed on the circumferential surface of the rotation guide upper plate 451 and lower plate 452, respectively, for switching the orientation fixed on the rear surface of the web pad cradle 420 preferably to convert the screen mode of the web pad system 700 to portrait mode or landscape mode when the cradle unit 410 rotates at a designated angle. A cradling projection unit 455 can be coupled to the end of the circumferential projection unit 454 for prohibiting the web pad system 700 placed on the web pad cradle 420 from being rotated more than a designated angle. The circumferential projection unit 454 can be locked to the angle limiting projection unit 436 that are regularly spaced by a designated angle on the rear surface of the cradle plate 421. Hammering grooves 456 can be spaced by a designated angle on the circumferential surface of the rotation guide member 450 and used for recognizing whether the web pad system 700 has been rotated through hammering of the hammering member 444 that is preferably mounted on one side of the cradle rear cover 440 as the cradle unit 410 is rotated the desired amount. A cradle hinge unit 457 can be fastened (e.g., screwed down) onto the other upper end of the arm unit 600 and the other side of internal arm settling groove 459 with a certain length being formed at the center of the rotation guide low plate 452 for allowing the cradle unit 410 onto which the web pad system 700 is cradled to rotate bank and forth using at least the arm unit 600. A cylindrical hinge unit 458 can be fastened at one side of the arm settling groove 459 in opposition to the cradle hinge unit 457 for supporting effluent connector PCB 435 wires from the arm settling groove 459 and at the same time, for reducing or preventing the turning force (or turning effect) of the cradle unit 410 from being placed or directed to one side only.

A length of the circumferential projection unit 454 is preferably approximately one third of the designated rotation angle of the cradle unit 410. Hence, when the cradle unit 410 rotates, the orientation switch 437 fastened on the rear surface of the web pad cradle 429 can be turned off up to ⅔ of the total length, which is shorter than the designated rotation angle of the cradle unit 410, so the screen mode of the web pad system 700 remains at its original mode, e.g., portrait mode. However, if the rotation angle of the cradle unit 410 is greater than the ⅔, which can preferably be a contact point with the circumferential projection unit 454, the orientation switch is turned on by the circumferential projection unit 454, and the screen mode of the web pad system 700 converts to landscape mode from portrait mode.

A fixing member 458a of the cylindrical hinge unit can fixate the cylindrical hinge unit. As described above, using the rotation guide member 450 and the cradle unit 410, the web pad cradle 420 and cradle rear cover 440 can be rotated.

Figure 9B:
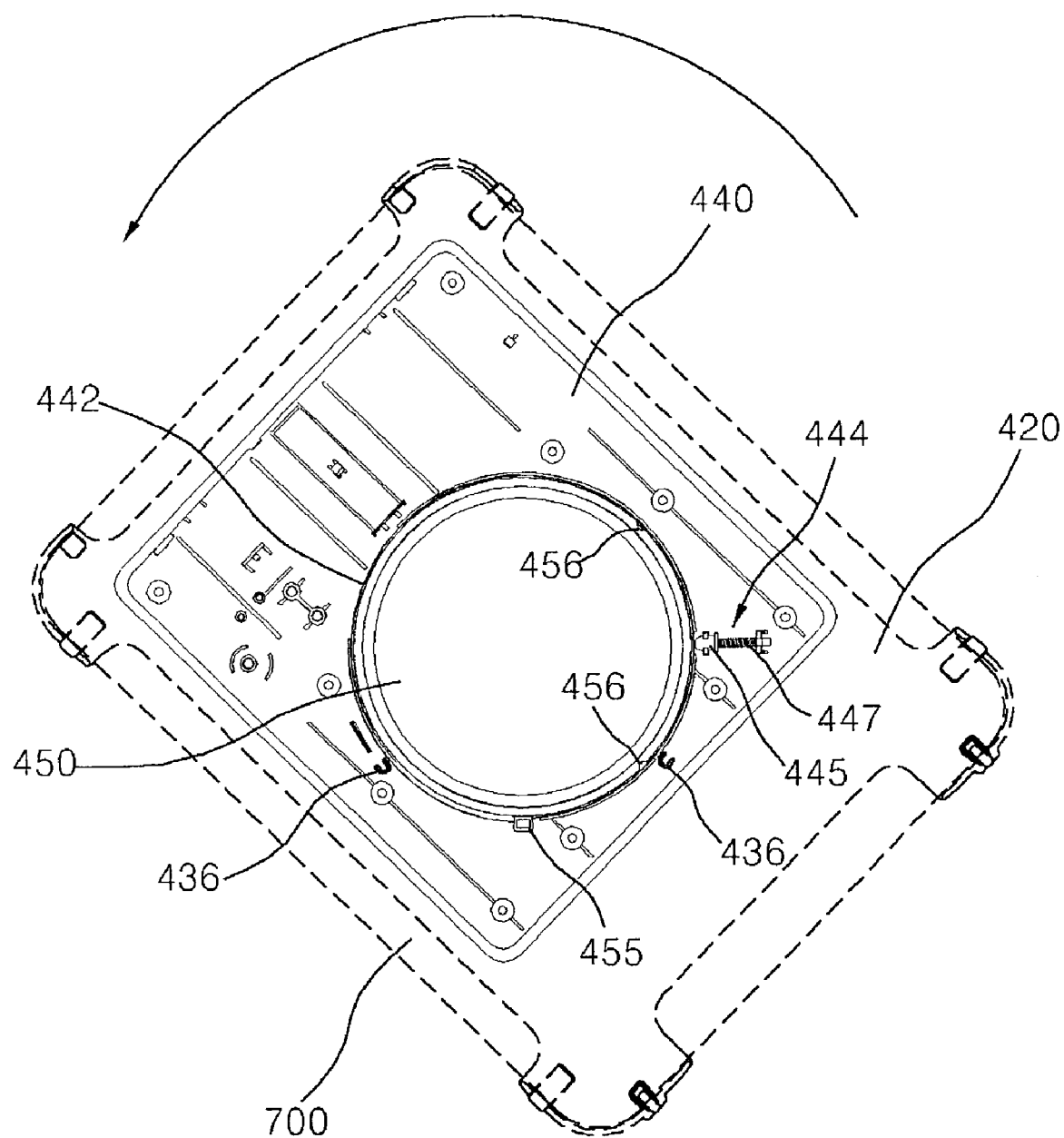
FIG. 9b is an exemplary diagram illustrating a cradle unit being rotated at a predetermined angle using a rotation guide member.

FIGS. 9a–9c diagrammatically depict the operational state of the exemplary cradle unit being rotated at a designated angle with help of the rotation guide member according to preferred embodiments of the present invention. FIG. 9a diagrammatically shows the state before the cradle unit is rotated, FIG. 9b diagrammatically shows the cradle unit being rotated at a designated angle with help of the rotation guide member, and FIG. 9c diagrammatically shows the state where the cradle unit is rotated at a designated angle.

Figure 10B:
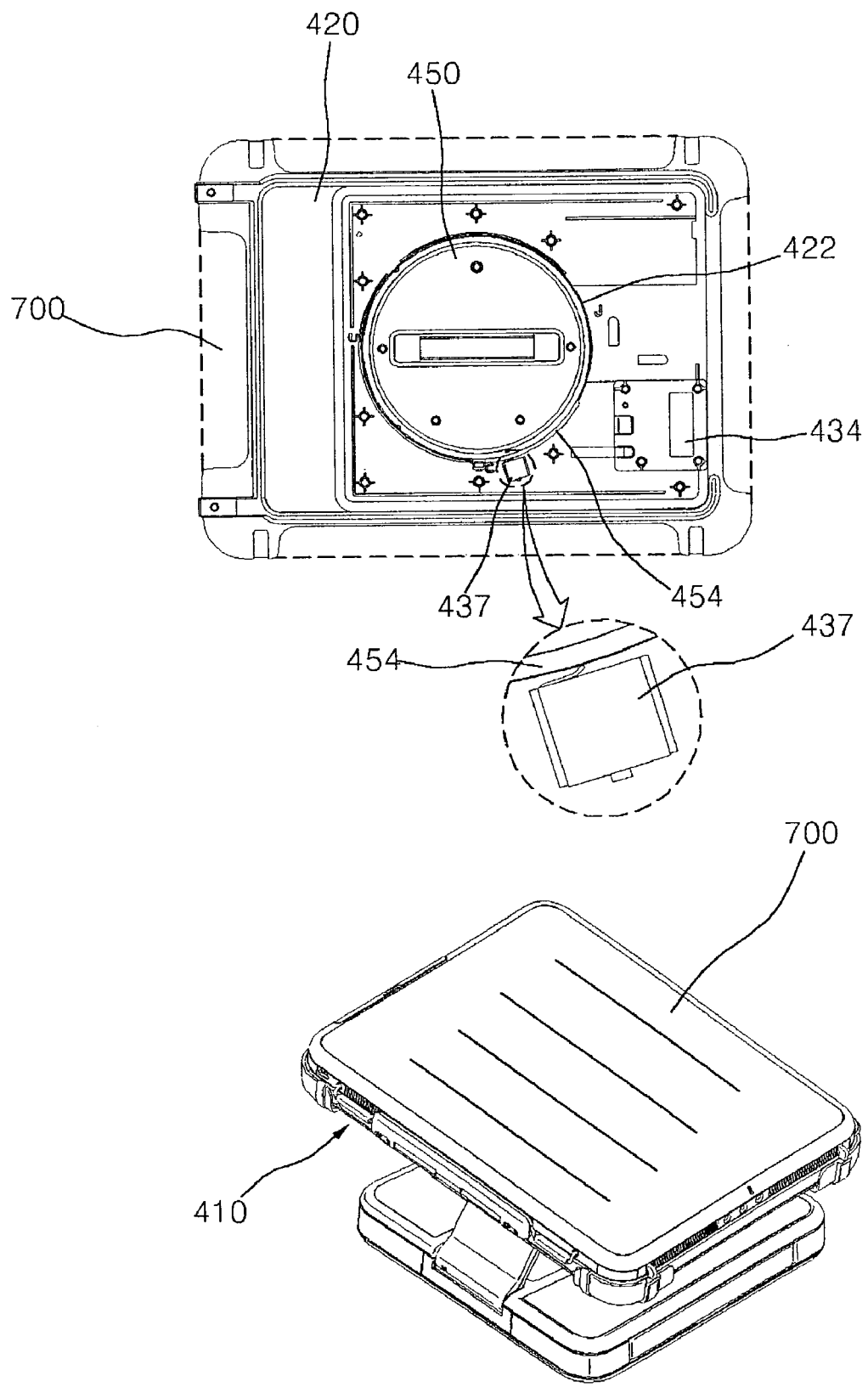
FIG. 10b diagrammatically illustrates an exemplary screen mode of the web pad system having been converted to the landscape mode from the portrait mode according to a rotation angle of the cradle unit.

FIGS. 10a–10b diagrammatically illustrate a situation in which a screen mode of the web pad system can be converted to a portrait mode or landscape mode in accordance with a rotation angle of the cradle unit with help of the rotation guide member according to preferred embodiments of the present invention. FIG. 10a diagrammatically shows the screen mode at the portrait mode before it is converted to the landscape mode, and FIG. 10b diagrammatically shows the screen mode of the web pad system having been converted to the landscape mode from the portrait mode according to a rotation angle of the cradle unit.

To convert the screen mode of the web pad system 700 being cradled onto the web pad cradle 420 from portrait mode to landscape mode, the web pad cradle 420 can be first rotated as shown in FIG. 9a. Then as shown in FIGS. 9a–9c, the web pad cradle 420 can be rotated by pressuring the front projection unit 445 of the hammering member 444 mounted at one side of the front end of the outer circumferential surface of the through hole 442 of the cradle rear cover 440 using the circumferential surface of the rotation guide member 450. Later, when the web pad cradle 420 preferably rotates at a designated angle or amount and then reaches to one hammering groove 456 on the circumferential surface of the rotation guide member 450, the front projection unit 445 of the hammering member 444, as shown in FIG. 9c, having been pressured by the circumferential surface of the rotation guide member 450 returns to its original position, and hits the hammering groove 456. In the course of that, a hammering sound or vibration is preferably generated, and through the hammering sound or vibration, the user can preferably find out that the cradle unit 410 has been properly rotated, and he/she does not need to rotate the cradle unit 410 any further.

Preferably, if the user rotates the cradle unit 410 by more than allowed, the cradling projection unit 455 of the rotation guide member 450 can be cradled onto the angle limiting projection unit 436 being spaced by the designated angle on the outer circumferential surface of the through hole 422 of the rear surface of the web pad cradle 420. Accordingly, further rotation of the cradle unit 410 can be successfully prevented or reduced.

As FIG. 10a illustrates, when the cradle unit 410 is rotated at a designated angle with help of the rotation guide member 450 while the web pad system is being cradled onto the cradle 410, the orientation switch 437 fixed on the outer circumferential surface of the through hole 422 of the rear surface of the web pad cradle 420 is preferably switched with help of the circumferential projecting unit 454 formed on the circumferential surface of the rotation guide member 450. The switched signal can be transferred to the web pad system 700, for example, through the drive connector 434. As a result, the screen mode of the web pad system 700 is preferably converted from portrait mode to landscape mode as shown in FIG. 10b.

Also, if the user rotates the cradle unit 410 to the opposite direction to return the screen mode in the landscape mode back to the portrait mode, the orientation switch having been switched by the circumferential projection unit 454 of the rotation guide member 450 is preferably released or switched back. Accordingly, the screen mode can be converted from landscape mode to portrait mode.

Figure 11:
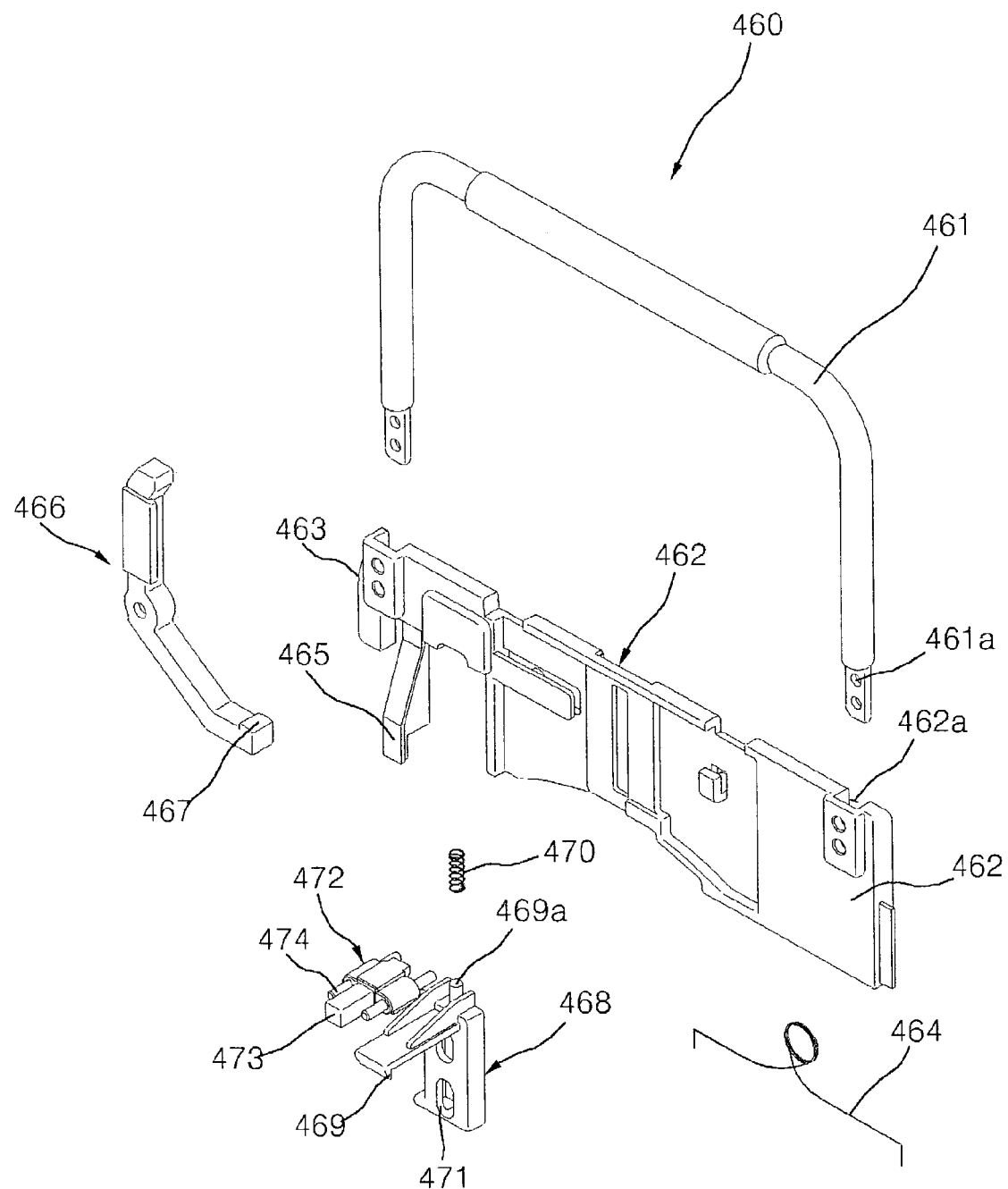
FIG. 11 is a sectional perspective view of an exemplary web pad system separating apparatus.

FIG. 11 is a sectional perspective view of a web pad system separating apparatus out of components of the cradle unit according to preferred embodiments of the present invention. The web pad system separating apparatus 460, as depicted in FIG. 5 and FIG. 11, can include a separating handle 461 for applying external force to separate the web pad system 700 from the web pad cradle 420, an operational cam member 466, a locking member 468 and a separating member 472. An interlocking member 462 can be coupled to the separating handle 461 to preferably perform cam operations by moving downward in order to separate the web pad system 700 from the web pad cradle 420 as the external force is applied through the separating handle 461, and returns to its original position with help of resilient force of the spring 464 or the like if no weight is present. The operational cam member 466 can pressure and release force of the locking member 468 that locks the web pad system 700 preferably through the cam operation with the cam 463 on the side of the interlocking member 462 by the interlocking member 462. The locking member 468 preferably with a cradling projection 469 on the upper end can be inserted to a coupling projection 475 at a low end of the operational cam member 466, of which locking force is released by a projection unit 467 of the other side of the operational cam member 466 that can be interlocked downward through the cam operation with the interlocking member 462, or can lock with the web pad system 700 by the cradling projection 469 by returning to its original position with help of the resilient force of the spring 460 if no external force is present. The separating member 472 preferably fixated on the upper end of the projected cam 465 of the interlocking member 462 can be for separating the web pad system 700 when locking force of the locking member 468 has been released as the locking member 468 ascends through the cam operation with the projected cam 465 of the interlocking member 462, from the web pad cradle 420.

There can be a plurality of inserting holes 471 at the lower end of the locking member 468 so that the locking member 468 can be inserted into the low end of the operational cam member 466, e.g., the coupling projection 475 at the inner side of the cradle rear cover 440. Preferably, the inserting hole 471 is long enough for the locking member 468 to interlock downward with help of the projection unit of the other side of the operational cam member 466 that interlocks downward through the cam operation with the interlocking member 462.

The separating member 472 can have a concave-convex shape. That is, a square pillar projection unit 471 can be projected on the upper side of the member, and a guide bar 474 can be inserted into both sides of the square pillar projection unit 473 for acting as a guide to help the separating member 472 to smoothly ascend/descend through the cam operation with the projection cam 465 of the interlocking member 462. The separating member 472 can be united with the interlocking member 462 at its upper end, and have the projection cam 465 being inserted therein to facilitate ascending/descending of the square pillar projection unit 473 through the cam operation with the projection cam 465 that preferably moves to the same direction as the interlocking member 462 in conforming to the operation of the interlocking member 462.

Figure 12A:
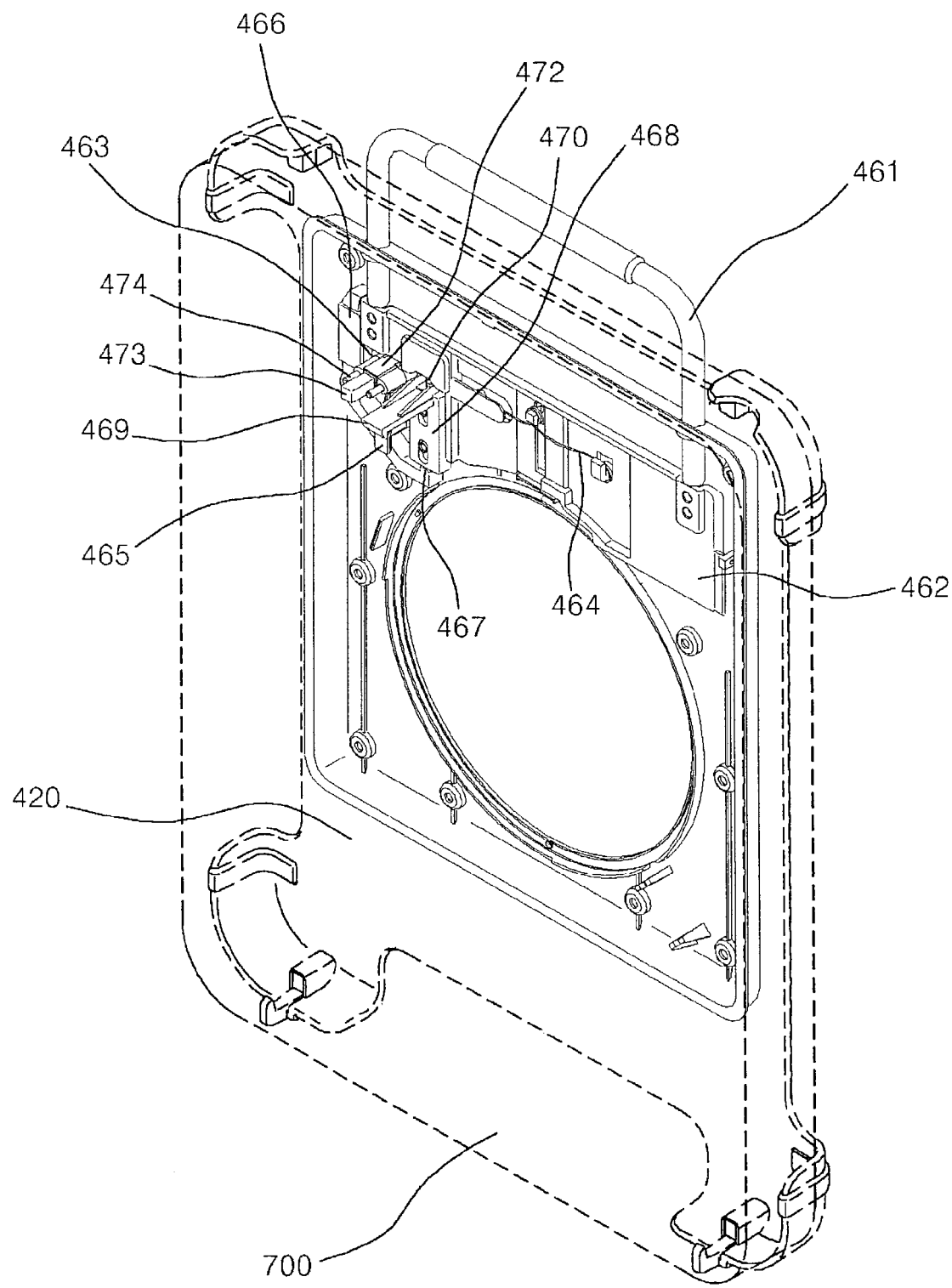
FIG. 12a diagrammatically represents the state before the web pad system separating apparatus is operated.
Figure 12B:
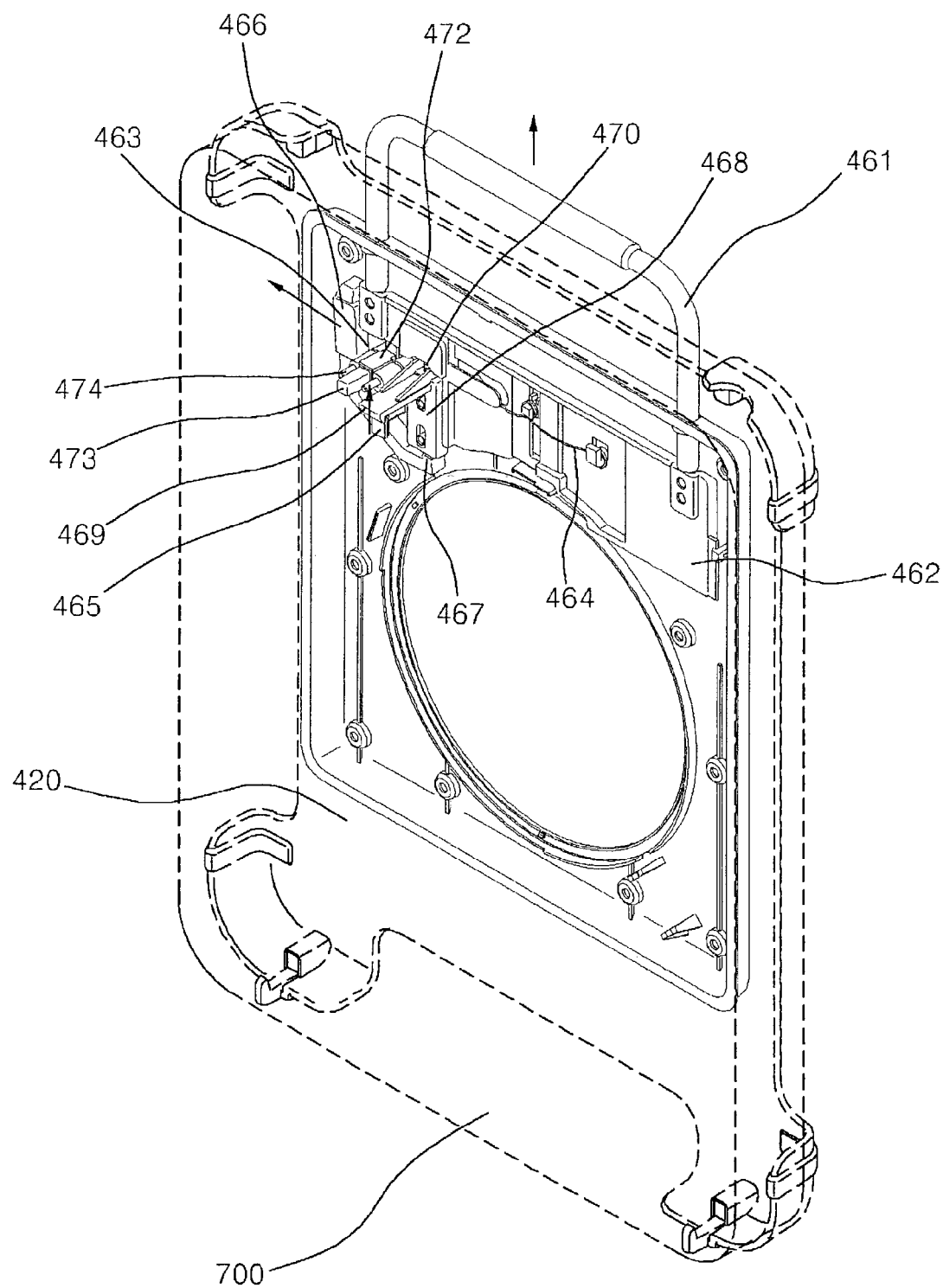
FIG. 12b diagrammatically represents the state where a locking member locks the web pad system.
Figure 12C:
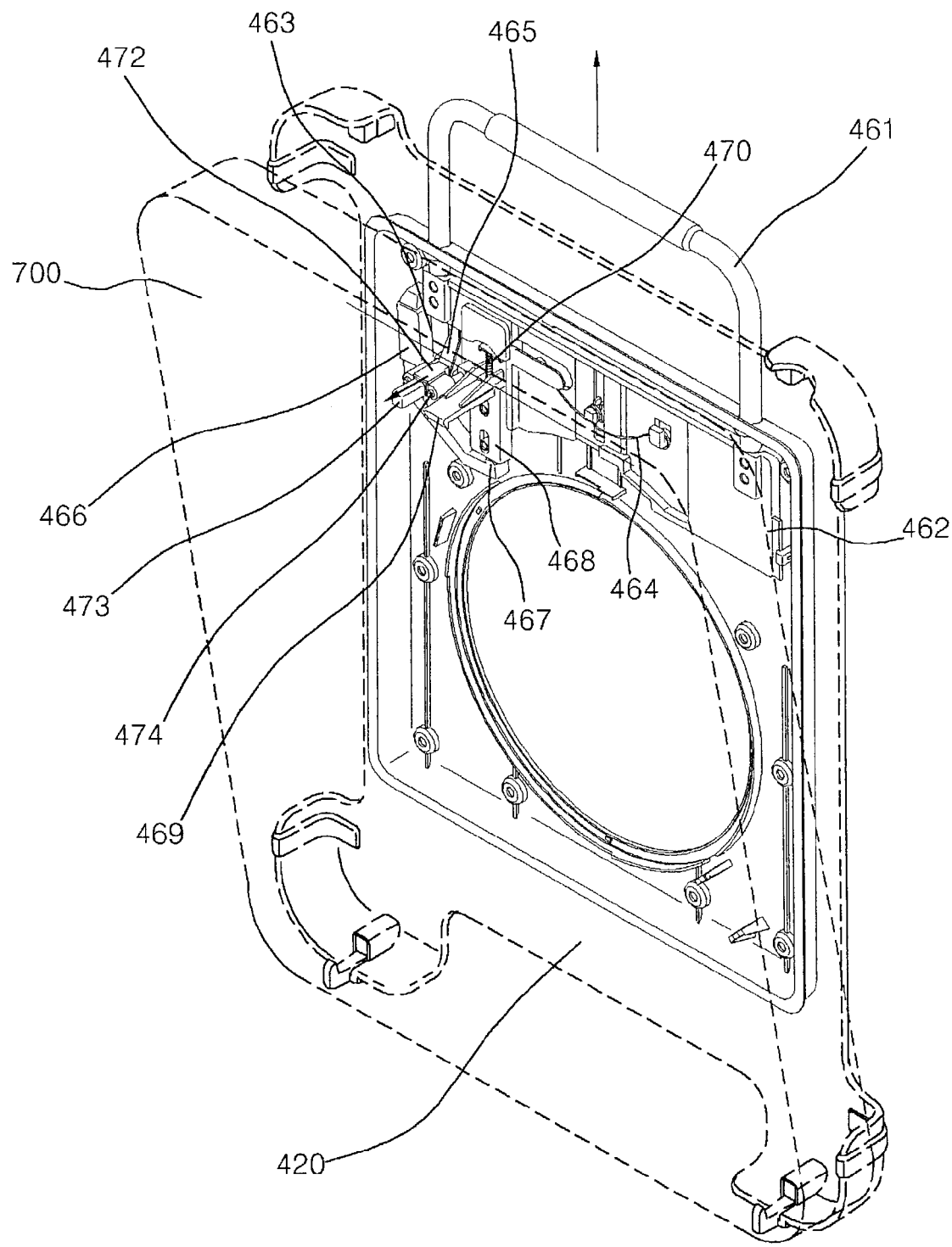
FIG. 12c diagrammatically represents the state where a locking member has been released.

FIG. 12*a* diagrammatically represents the state before a web pad system separating apparatus is operated. FIG. 12*b* diagrammatically represents the state where locking force of an exemplary locking member that locks the web pad system by the operation of the exemplary web pad system separating apparatus is being released. FIG. 12*c* diagrammatically represents the state where the web pad system of which locking force of the locking member having been released by the operation of the exemplary web pad system separating apparatus is being separated by a separating member.

If the user wants to separate the web pad system 700 that is cradled onto the web pad cradle 420, he/she can pull the separating handle 461, as shown in FIG. 12*a*. Then, the interlocking member 462 coupled to the separating handle 461 moves downward, and preferably one side of the operational cam member 466 where the cam operation involving a side cam 463 of the interlocking member 462 and the operational cam member 466 takes place, becomes open to the outside, and the projection unit 467 of the other side of the operational cam member 466 interlocks toward the locking member 468, thereby pressuring the locking member 468.

Further, spring 470 of the locking member 468 having been pressuring by the projection unit 467 of the other side of the operational cam member 466 can be compressed, and the interlocking member 462 is pressured and downward, which is the same direction as the interlocking member 462. At the same time, the cradling projection 469 of the locking member 468 can be pushed down, and, as FIG. 12*b* depicts, the locking force of the cradling projection 469 for locking the web pad system 700 can be released. In this manner, the web pad system 700 can be duly separated from the web pad cradle 420.

In case that the interlocking member 462 further descends despite of the locking force of the locking member 468 having already been released, as shown in FIG. 12*c*, the square pillar projection unit 473 can ascend by traveling on the guide bars 474 on the both sides through the cam operation of the projection cam 465 and the separating member 472. The square pillar projection unit 473 can push up the web pad system 700 without coupling force in the locking member 469, and separates the web pad system 700 from the web pad cradle 420.

If the external force is no longer applied to the separating handle 461, the interlocking member 462 and the locking member 468 can go back to their original positions preferably with help of resilient force of the spring 464 of the interlocking member 462 being freed from tension and the spring 470 of the locking member 468 being freed from compression. As described above, the web pad system 700 can be separated through the cam operation of the web pad system separating apparatus 460.

Embodiments of the present invention can provide a screen converting structure of a web pad system having a convertible screen from portrait mode to landscape mode or from landscape more to portrait mode, and a rotary cradle on which the web pad system is placed, and an arm attached to controllably pivot the rotary cradle to between prescribed heights related to a stand while providing a prescribed viewing angle relative to horizontal. Embodiments of the present invention can allow users to use the system in an appropriate mode more conveniently, for example, by rotating a cradle at a designated angle at anyplace.

Embodiments of the present invention can provide a screen converting structure of a web pad system that includes an orientation switch that is fixated on peripheral surface for converting screen mode of the web pad system to portrait mode or landscape mode by switching by rotation of the web pad cradle, and a circumference projection that is formed on circumferential surface of the rotation guide member for switching the orientation switch to make the screen mode of the web pad system converted to portrait mode or landscape mode when the cradle rotates at a designated angle. Embodiments of the present invention provides more convenience to users with their work, in which the users can rotate a cradle and change a height on which the web pad system is cradled at a designated angle to be appropriate for users' viewing angles or particular places, and a screen mode of the web pad system can be correspondingly updated.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A screen adjustment structure of a computer system for converting a screen mode of the computer system from a portrait mode to a landscape mode or from the landscape mode to the portrait mode by rotating a cradle on which the computer system is cradled through a designated angle using a rotation guide member, the screen adjustment structure comprising:

an orientation switch that is on an outer surface of a through hole on a rear surface of the cradle and is configured to adjust the screen mode of the computer system to the portrait mode or to the landscape mode by switching through a rotation of the cradle; and a circumference projection that is on a circumferential surface of the rotation guide member and is configured to switch the orientation switch to make the screen mode of the computer system adjust to the portrait mode or the landscape mode when the cradle rotates past a predetermined angle, wherein, when the cradle rotates, the orientation switch is turned off up to ⅔ of a total length that corresponds to a designated rotation angle of the cradle, wherein the rotation angle of the cradle is greater than an angle corresponding to ⅔ of the total length, and the orientation switch is turned on as it is switched by a contact point of the circumference projection.

2. The structure according to claim 1, wherein a length of the circumference projection unit corresponds to substantially one third of a total rotation angle of the cradle.

3. The structure according to claim 1, comprising:

an arm pivotably coupled to the cradle;

a stand pivotably coupled to the arm;

a first pivot attached to the stand and the arm configured to adjust a height of the cradle; and a second pivot attached to the arm and the cradle configured to adjust an angle between the cradle and the stand.

4. A screen adjustment structure of a computer system for converting a screen mode of the computer system from a portrait mode to a landscape mode or from the landscape mode to the portrait mode by rotating a cradle on which the computer system is cradled through a designated angle using a rotation guide member, the screen adjustment structure comprising:

an orientation switch that is on an outer surface of a through hole on a rear surface of the cradle and is configured to adjust the screen mode of the computer system to the portrait mode or to the landscape mode by switching through a rotation of the cradle; and a circumference projection that is on a circumferential surface of the rotation guide member and is configured to switch the orientation switch to make the screen mode of the computer system adjust to the portrait mode or the landscape mode when the cradle rotates past a predetermined angle, wherein, when the cradle rotates, the orientation switch is turned off for up to ⅔ of a total length of the circumference, keeping the screen mode of the computer system in the portrait mode, wherein when the rotation angle of the cradle is greater than ⅔ of the total length of the circumference, the orientation switch is turned on by a contact point of the circumference projection to convert the screen mode of the computer system to the landscape mode, and wherein the orientation switch is one of a mechanical switch and a magnetic switch.

5. The structure according to claim 4, wherein a length of the circumference projection unit corresponds to substantially one third of a total rotation angle of the cradle.

6. The structure according to claim 4, further comprising:

an arm pivotably coupled to the cradle;

a stand pivotably coupled to the arm;

a first pivot attached to the stand and the arm configured to adjust a height of the cradle; and a second pivot attached to the arm and the cradle configured to adjust an angle between the cradle and the stand.

* * * * *